(12) United States Patent
Hendel et al.

(10) Patent No.: US 9,501,645 B2
(45) Date of Patent: Nov. 22, 2016

(54) SYSTEM AND METHOD FOR THE PROTECTION OF COMPUTERS AND COMPUTER NETWORKS AGAINST CYBER THREATS

(71) Applicants: Rudolf H. Hendel, Summit, NJ (US); Catherine G. Lin-Hendel, Summit, NJ (US)

(72) Inventors: Rudolf H. Hendel, Summit, NJ (US); Catherine G. Lin-Hendel, Summit, NJ (US)

( * ) Notice: Subject to any disclaimer, the term of this patent is extended or adjusted under 35 U.S.C. 154(b) by 0 days.

(21) Appl. No.: 14/216,789

(22) Filed: Mar. 17, 2014

(65) Prior Publication Data

US 2014/0317746 A1     Oct. 23, 2014

Related U.S. Application Data

(60) Provisional application No. 61/801,113, filed on Mar. 15, 2013.

(51) Int. Cl.
*G06F 21/56* (2013.01)
*H04L 29/06* (2006.01)

(52) U.S. Cl.
CPC .......... *G06F 21/566* (2013.01); *H04L 63/145* (2013.01)

(58) Field of Classification Search
CPC ................... G06F 21/53; G06F 21/568; G06F 21/57; H04L 63/1408; H04L 63/02
USPC ........ 726/23, 24; 713/152; 709/225
See application file for complete search history.

(56) References Cited

U.S. PATENT DOCUMENTS

| | | | |
|---|---|---|---|
| 6,012,086 A * | 1/2000 | Lowell | 709/218 |
| 7,484,247 B2 * | 1/2009 | Rozman et al. | 726/34 |
| 7,523,493 B2 * | 4/2009 | Liang et al. | 726/13 |
| 7,725,937 B1 * | 5/2010 | Levy | G06F 21/554 713/187 |
| 8,225,404 B2 * | 7/2012 | Freericks et al. | 726/24 |
| 8,266,708 B2 * | 9/2012 | Shevchenko et al. | 726/26 |
| 8,370,899 B2 * | 2/2013 | Shoval et al. | 726/2 |
| 8,549,625 B2 * | 10/2013 | Ollmann | 726/22 |
| 8,694,993 B1 * | 4/2014 | Dotan et al. | 718/1 |
| 8,782,174 B1 * | 7/2014 | Dotan et al. | 709/219 |
| 2001/0056548 A1 * | 12/2001 | Blumberg | 713/201 |
| 2007/0240216 A1 * | 10/2007 | O'Sullivan et al. | 726/24 |
| 2009/0094332 A1 * | 4/2009 | Schemers et al. | 709/206 |
| 2009/0193503 A1 * | 7/2009 | Shevehenko et al. | 726/4 |

* cited by examiner

*Primary Examiner* — Saleh Najjar
*Assistant Examiner* — Oleg Korsak
(74) *Attorney, Agent, or Firm* — Barnes & Thornburg LLP

(57) ABSTRACT

Systems and methods for protecting against cyber threats are disclosed. The system includes an external network accessing layer (ENAL) and a core computing asset overlaid by the ENAL. The ENAL comprises at least one external network access cell (ENAC), wherein the at least one ENAC contains at least one communications port, one or more processors, working and storage memories and is configured to be connectable to an external network and to inspect data received from the external network. The core computing asset is overlaid by the ENAL and comprises at least one core computer configured to not be connected to the external network but to be capable of being connected to the ENAL. The core computing asset contains data and software that are to be protected from cyber threat.

27 Claims, 5 Drawing Sheets

SYSTEM AND METHOD FOR THE PROTECTION OF COMPUTERS AND COMPUTER NETWORKS AGAINST CYBER THREATS

RELATED APPLICATIONS

This application claims the benefit of U.S. Provisional Application Ser. No. 61/801,113, filed Mar. 15, 2013, entitled "System and Method for the Protection of Computers and Computer Networks Against Cyber Threats" which is hereby incorporated by reference in its entirety.

FIELD OF THE INVENTION

This invention relates to virus, malware and intrusion protection for computers and computer networks.

BACKGROUND OF THE INVENTION

Almost all computers in use today are connected to the Internet. With this connection, there has come a rapid rise of cyber threats, the infection of computers with viruses, computer worms, Trojans, spyware, adware and generally with any object that contains malicious code. These threats are referred to generally under the term of malware. The ever increasing complexities of these threats make the existing protection software and methods inadequate and ineffective, thus requiring a new paradigm, a new approach that are not available now, in order to identify the threats, to analyze attacks, to protect important hardware, software, and data against corruption and attacks, and to ultimately effectively defend against them without grinding computers and networks to a crawling speed or to a halt.

The typical protection available against cyber threats is protection software, such as is offered by MacAfee, Norton, Kaspersky and others. These programs compile "footprints" of known viruses and scan incoming files for such footprints. Any files containing similar suspicious footprints are detected, rejected, deleted, or isolated (quarantined).

In spite of this inspection of downloaded files, and in spite of periodic re-scans of all files on a computer for newly discovered virus and malware programs, infection of computers is common occurrence for everyone, and the infections and corruptions are increasingly severe. These protection software also run slowly and use up much computing resources on the hardware, often make computers running these protection software annoyingly slowly for other tasks. Cyber threats have evolved from simply annoying in the past to causing real damage and crippling computers and networks. Recent attacks have caused financial damage (by stealing financial information), have resulted in the stealing of commercially valuable and confidential information, have maliciously erased data (either globally—by wiping out and reformatting an entire disk storage device, or surgically, by removing targeted files selectively).

The rapidly increasing damages caused by such attacks have not gone un-noticed. Congress has passed the Cyber Security Act of 2012, elevating the awareness to the problem, yet offering no practical solution. The bottom line is that the current approach to cyber security is not working and inadequate. A new approach is urgently needed.

This invention offers such a new approach.

BRIEF DESCRIPTION OF FIGURES

FIG. 3:
Connectivity Flow

DETAILS OF THE INVENTION

Figure 1:
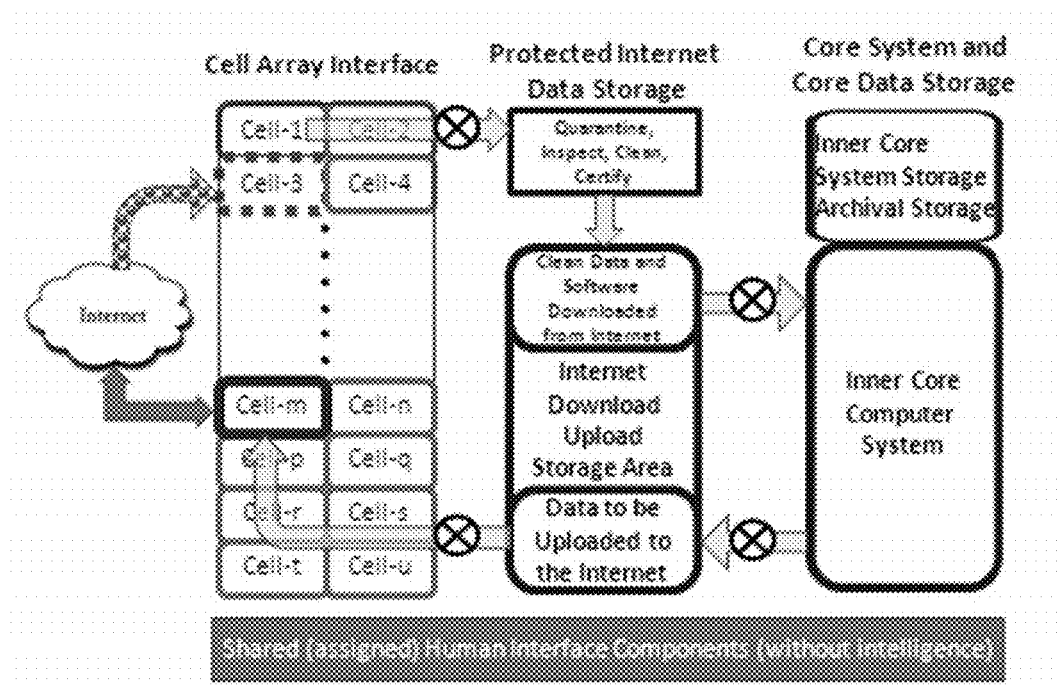
FIG. 1:
A Schematic for a system for the Protection of Computers and Computer Networks against Cyber threats.

This patent application is intended to describe one or more embodiments of the present invention. It is to be understood that the use of absolute terms, such as "must", "will" and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be operational with numerous general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile an nonvolatile, removable and non-removable media implemented in any method or technology for storage of information such as computer readable instructions, data structures, program modules or other data. Computer storage media includes, but is not limited to, RAM, ROM, EEPROM, Flash memory or other memory technology, CDOROM, digital versatile disks (DVD), or other optical disk storage, magnetic cassettes, magnetic tape, magnetic disk storage or other magnetic storage devices, or any other medium which can be used to store the desired information and which can be accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared or other wireless media. Combinations of the any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions by the processing device is transformed into a second set of data as a consequence of such execution. This second data set may subsequently be stored, displayed, or otherwise communicated. Such transformations, alluded to in each of the above examples, may be a consequence of, or otherwise involved the physical alteration of portions of a computer-readable medium. Such transformation, alluded to in each of the above examples, may also be a consequence of, or otherwise involve, the physical alteration of, for example, the states of registers and/or counters associate with a processing device during execution of software or computer executable instructions by the processing device.

As used herein, a process that is performed "automatically" may mean that the process is performed as a result of machine-executed instructions, and does not, other than the establishment of user preferences, require manual effort.

The present invention proposes a new way of protecting computers, computer networks, and data and software on computers against security threats from the Internet. The invention combines multiple defensive measures using both hardware and software, while the conventional approach uses only as contrasting the conventional pure software on a computer or a computer network to be protected, and all of the resources of the computer and the computer network is exposed to the Internet.

This invention proposes a new way of configuring a computer, a computer network, or a network server to be over-layered by an array of separate, replicated computing cells, each with its own CPU, memory and communications ports for the purpose of accessing an external network, such as the Internet (hereafter referred to as 'External Network Access Cells,' or ENACs). These computing cells, or ENACs can be physically separate, or can be fabricated onto a single integrated circuit chip, using a multi-core architectures where multiple, independent CPUs are contained within a single chip. ENACs also contain localized and dedicated storage, such as FLASH Memory, sufficient to satisfy the download need of typical user sessions. As of this writing, 32 GB Flash USB devices are available for <$10, and prices will continue to decrease and capacity increase. Cost effective dedicated data storage for ENACs is a reality today. ENACs do not provide archival storage. Archival storage can be positioned behind additional protective walls or a secured network, or other archival cores in the organization. Archival storage can be physically separated and segmented by data types: For example, all videos on one disc drive; all pictures on another; all audio on a third; everything else on a fourth. Physical separation and ordering by data type simplifies data back-up operations and simplifies the detection of certain data anomalies and abnormalities.

An optional additional security measure is to also partition primary assets in the computing network under the protective hardware over-layer into Cores of specific data and related software classes. The Cores can share a set of user interface devices which includes a display, an input mechanism, audio, microphone, and maybe also camera. Each Core can be operated offline and independent of each other. The Cores can also be interconnected with each other while isolated from external network. A pre-connection testing procedure can also be automatically run, run with spot-test procedure, or run under administrator or user request.

Also included in this protective hardware over-layer, is a dedicated data bus serving to connect an approved certified clean cell in the protective hardware over-layer to a Core, and a switch that severs the connection of this bus to a Core.

While the invention applies generally to all computers and computer networks, the focus of the approach is directed towards home computers, home networks and small business where security and computing expert resources are scarce, and protection needs to be highly automated, foolproof reliable, and transparent to users, and can be economically implemented. On the other hand these virtues are also highly desirable to all entities, including governments, corporations, superstores and banks.

In the known Art, data and software for online tasks and off line work are lumped together on a computer, and each and all computers whether in an internal network or not, are all connectable, and often connected most of the time to the Internet or another external network.

In the present invention a computing asset, a computer or a network of computers and data and software residing on them to be protected are never directly connected to an external network. The connection to the external network is executed by the ENACs layering over the computing assets to be protected.

Furthermore, the computing assets inside the ENACs layer can be partitioned into multiple cores, each with its specific class of data, software, and secrecy and confidentiality needs. Surrounding the cores, are an array of computing cells used to either directly connect to external networks—the ENACs, or serving as interim storage and transporter for inspected clean data and software to be transported to a Core, which we will call Transport Cell. Multiple ENACs can share a display, which is the most costly component in a computing system. Also shared are user input/output devices, such as keyboard, mouse, touch screen, touch pad, stylus, etc. A first request to connect to the Internet (or an external network) is executed through one of the ENACS containing a processor and non-archival memory. Upon a user's first internet connection request, one cell is selected at random by software or firmware. The selection process is transparent to the user. The selected cell is connected to the shared input/output devices (LCD, keyboard, mouse etc.), then connected to the Internet. Prior to the connection to the Internet, all cells are tested, cleansed, and certified as virus, infection, and malware free. Multiple set of IOs shared between ENACS will allow parallel and independent Internet sessions.

During the connection of a ENAC, data-exchange between the ENAC and the external network (ex.: Internet) contacted, operates the same as a computer does today, using traditional malware and virus protection. However, since this level of protection has proven to be insufficient, data to be downloaded to the inner system storage areas is being scrutinized and tested further.

After the first Internet session, the connections to the I/O devices are moved to another clean cell to allow a user to work off line with the software and data on the certified clean cell. The cell previously used for connection to the Internet is thoroughly inspected, and downloaded files re-checked and additional tests performed. For example, the downloaded data may be passed to additional ENACs to be examined by different protection software provided by different malware protection manufacturers. These systems typically do not function in concert, and a user has to select a single preferred vendor, which may be the most effective in detecting or removing a particular set of malware, while not so effective on another set of malware. Any corruption found is then fixed, and any infection found removed. When the cell and the downloaded data are both certified as clean, the data is transferred into an "Internet Upload/Download Storage Area" and the cell is put back into the free ENACs pool, available for a new connection to the Internet. Any downloaded data and/or software that would useful and beneficial to other cells are placed into a special storage area only accessible to the ENACs in the cell array. Such operations are not possible with the state of the art system configuration for cyber threat protection. The present invention also proposes test methods that allow the detection of virus/malware types not detectable on conventional computer systems using conventional virus protection software, such as monitoring of unauthorized data transmission to and from potentially damaging source and destinations. One example this invention enables is the ability to overload key-logging tracking programs. One more example is this invention's ability to compare the performance the performance of known good ENACs to recently used ENACs for statistically significant differences that may be indicative of an infection.

A second Internet session request will be executed on a second ENAC chosen at random by software or firmware from a pool of available ENACs—those cells not currently in use, and not undergoing tests for infection and corruption, nor undergoing fixing and cleaning.

Cells previously used for Internet sessions will be returned to the pool of available cells after they are returned to a known clean and good state and certified as such.

Certified downloaded files are transferred to an "Internet download" archival area where they are stored permanently. This area does not have a direct connection to the Internet. Connection between this area and the core computer are limited and closely managed. All user created clean data and clean working software are archived in a data and software archival area, which is also never connected to the Internet.

The most sensitive and confidential information, data, and software are contained in a first core having a dedicated processor CPU, dedicated memory (DRAM and FLASH) and dedicated data storage. This core will never be connected to the Internet. A second level of data and software are stored in a second core. Surrounding the cores are multiple and independent units of computing cells, ENACs, each having its own processor CPU and memory installed with software needed to operate on the Internet, and sharing at least one set of IOs. These cells are used to access the Internet or other unsecured network. While a certain amount of data storage will be required in a cell, archival storage using magnetic media is not required. The memory needs of the cells are temporary, can be overwritten periodically and can be satisfied with FLASH memory or any other read/write storage technology. These ENACs do not require high performance CPUs. Cheaper off the shelf units (such as ARM processors, currently costing approximately US$10) will suffice. Even cheaper CPUs can be designed and made for ENACs.

An Internet access session is conducted through a single ENAC, chosen at random from an available pool of ENACs. A transition from one ENAC to another is transparent to the user—an available shared common "human interface" components such as LCD display, mouse, keyboard, camera, microphone, speakers will be automatically switched to a cell currently chosen for a user session to connect to the Internet or to an unsecured network without risking Cores and other ENACs through the connection.

Any download requested by the user will be limited to the memory of the cell presently actively connected to the Internet through which the download request is made, and can be readily quarantined.

Each ENAC will have an array of ghost addresses and directories and appear like a typical computer set-up to any virus or malware which may be embedded in a download, an email, or an Internet page. Any attempt to erase data globally or surgically by these malware will be limited to this single ENAC, and damage caused by the malware would be only to the information or data downloaded by the user during that one Internet session. In addition to the installation of ghost addresses and ghost directories, one can also install booby traps to trap virus or malware, and to dynamically trace and clean malwares at their source. With the present invention, scans by a protection software have a much smaller amount of data and a much smaller memory to inspect, and therefore will run much faster than the conventional method of scanning and checking the entire computing system including archival disc storage. While this can still be performed at the option of the user, it needs to be performed at much extended intervals.

An approach used by advanced malware is to hide a small program hidden in an attractive or useful object such as a beautiful image or a funny video, or even an application perhaps called MalwareProtect, and sneak into a computer and all other computers connected to the computer through which the request for the object is made. Such malware is further spread through sharing, including e-mails. Such programs are easy to hide and difficult to detect. The purpose of such programs is to wake up at a later time, and at that time to connect through the little sneaked-in spy bridge program to a server where more malwares are stored, which then downloads another, more extensive program to explore the infected system and report back (concurrently or later) of its finding. Those programs frequently target files containing passwords. Another malware approach is to install keyboard logging software to follow anything a user types into the keyboard.

These malware invasion approaches and methodologies are thwarted by randomly switching between available cells. A previously used and cleaned cell with its data already offloaded to another cell or to a core not connected with the Internet will then be used to connect to the internet idly as a trap-cell to monitor any traffic from or to the cell. Since the cell is not being used by a user, any traffic is not authorized and an indicator that the cell is being invaded by an unauthorized source. In that case, the traffic source can be immediately traced and reported. The cell can be equipped with software to analyze, thumb- and foot-print the malware and identify the offender URL. After the identification of the offender, this cell can be completely cleaned and reformatted to a known good state, then put in queue as an available ENAC for use to connect to the Internet again. Alternatively, at all times, one of the ENAC can be automatically assigned as a trap. Access to the known infected trap-cell can be (prior to being cleaned and made available for internet connection use again) given to security software developers to learn the new threats and infections that are on the cell as well as the URLs of the source of infections.

An ENAC can be separately designated exclusively for special purpose connections. For example, one specific ENAC can be selected to be exclusively dedicated for banking and financial transactions with pre-qualified institutions. Before connecting this ENAC to a pre-qualified institution/site, an idle cell can be used to connect to the pre-qualified institution, and test for traffic (which would of course be unauthorized). If there is no traffic after a predetermined safe time period, the connection is switched to the dedicated banking/financial transaction cell. This cell will be restricted from connecting with any other but a tested pre-selected site, when the user requests a banking transaction.

A proposed user interface for the present invention may start with a home page with a menu of different types of activities the Internet connectivity requested will be used such as banking, emailing, search for material and publications of a certain topic, entertainment, news, weather, maps and directions, shopping, general surfing . . . etc., allowing the user to select a desired/intended activity. If the selection is banking, the interface will automatically and transparently activate a pre-programmed procedure for banking and financial transactions. This procedure may include, 1) obtaining user specified destination site and check against an approved destination list while keeping the banking ENAC offline, 2) place a clean idle ENAC in connection with the approved user specified destination site, 3) observe traffic for a predetermined time period, 4) if there is no traffic, switch the connection to the Banking ENAC, 5) if there is traffic, alert the user and the destination site. If the selection is a general internet access, the interface will automatically and transparently assign an Internet interconnect cell and (for reference) display the cell ID. If the selection is for authorized work on transferring a clean down loaded software or data to an inner core computer, a dedicated cell that is not capable of being connected to the Internet, or, if acceptable, a clean cell not connected to the Internet or any other network will be chosen to connect to the core.

Sending and receiving emails will require the use of an ENAC. However, other than the sending and receiving actions, most of the tasks involving emails, including composition and reading can be and should be conducted off line. An embodiment of this invention is to use a Core dedicated for email. The archived emails, the sent and inspected clean received emails, the address book, the contact lists, the drafts all can be stored and manipulated in a specialized Email Core (EC) or Communications Core (CC) not connectable to the Internet. Also clean recorded voice mails and clean e-faxes can be stored in this Communications Core. While not necessary, an image of the recently cleaned and stored messages and frequently correspondents' email and phone addresses can be copied to an ENAC. The composition and addressing of emails, phone calls, and faxes are conducted on the Communications Core (CC) off line, and sent in batch or individually. When the composition and editing are completed to satisfaction, the user activates a "ready to send" button, or simply a "send" button, an transport application connects the Communications Core to a clean ENAC, copies the email, fax, or phone call to be sent, severs the connection to the Communications Core, and connects to the Internet. There can be multiple ENACs active and connected to the Internet in separate sessions. These independent sessions can operate separately from each other and are displayed on a GUI as separate pages. As an example, this allows e-mail sessions to remain open on a first ENAC, while other Internet activities occur over a second ENAC. Alternately, separate users can be using the ENACs array, each using a set of ENAC(s), and viewing pages on a separate Display Device.

Also on the GUI will be a "threat and computer health" indicator. User action on this button will request the display of information regarding detected threats, how they were handled and any suggestions for further action.

Internet cell activity may also be monitored by service companies tracking observed threat events in the connectivity cells. This monitoring will be restricted to observation only (and in cases of pre-specified permissions, to uploading images of suspicious activities to the tracking service company of suspicious activity. Downloading to a cell will not be allowed.

Cyber security software updates can be downloaded to specific areas responsible for testing downloaded, quarantined files.

The presence of unauthorized software downloaded to a computer can be manifested by the observation that the unauthorized software grabs resources from the CPU and makes the computer appear to run slowly. This allows an easy test in our approach. Representative tests can be run to compare the performance between a recently ENAC (but no longer actively used) and a known good (clean) cell. If there is a statistically significant difference between the performance of the recently connected cell and the known good cell, then an infection is likely and further investigation need to be taken to find the infection(s), and rid them from the cell.

Alternatively, the availability of mirrored (known good) cells can also detect tampering at the Firmware Level. Attacks which have successfully modified the operating system or BIOS have been reported. Periodic comparisons between the system software of a recently connected ENAC and a known good system software in a known good cell will be able to detect tampering or small snippets of software having been planted in the cell.

DESCRIPTION OF FIGURES

FIG. 1: A Schematic for a System for the Protection of Computers and Computer Networks against Cyber threats.

A Cell Array Interface comprising a number of independent cells which can connect individually or multiply to the Internet. In the depiction, Cell-m is actively connected to the internet. If the user requests the transfer of data or a file from the Inner Core Computer System, the file is first transferred to the Protected Internet Data Storage area, then transferred to the local storage of Cell-m. Alternatively, the one-way transfer of the data may go directly from the Inner Core Computer System to Cell-m's Flash memory before the cell is connected to the internet and data to be transmitted to a recipient. Before that Internet connection takes place and transmission starts, the connection between the ENAC layer and the Computing Core layer is severed, so that Cell-m appears as a stand-alone processor connected to the Internet.

Cell-1 had been previously connected to the internet with data being downloaded, and locally certified as clean. This allows the data to be transferred to the "Protected Internet Data Storage Area" (PIDS) for optional further inspection and certification. After passing that inspection, the download is certified for permanent storage in the Protected Internet Data Storage Area.

Cell-3 on the other hand was judged as infected during the local inspection and therefore is prevented from accessing the Protected Internet Data Storage nor to be connected to the Computing Core Layer. If it is possible to clean the data downloaded, it may be transferred to the quarantine area of the PIDS for further assessment. Alternatively, the browsing record of Cell-3 is going to be erased, the system being cleaned and (if needed) reformatted before being returned to the pool of available ENACs for future connections.

All connectivity between the respective layers: Cell Array Interface; Protected Internet Data Storage and Core System and Core Data Storage can be connected or disconnected as needed. This functionality is shown by the valve symbols.

Figure 2:
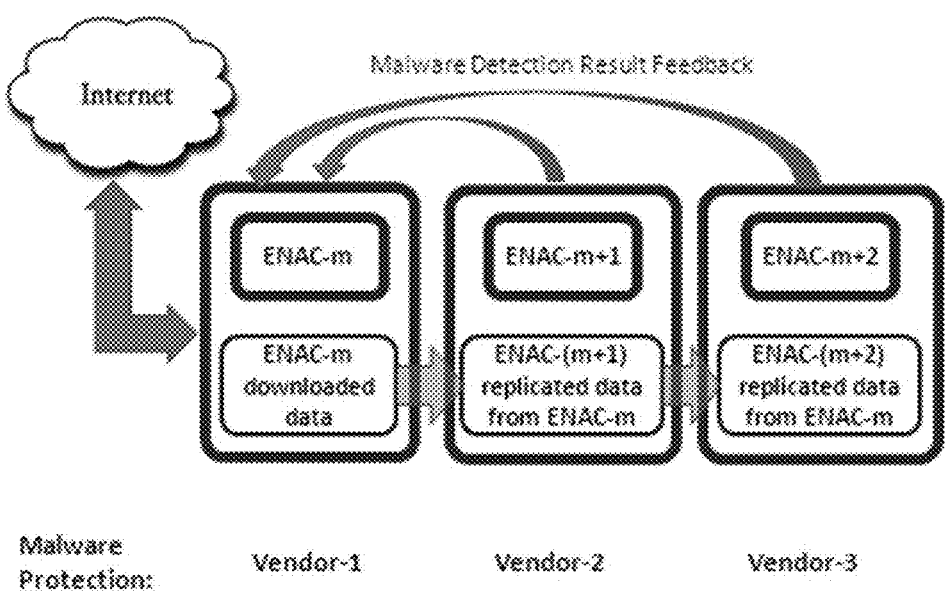
FIG. 2:
Intercell working connectivity between External Network Access Cells (ENACs)

FIG. 2: Intercell Working

A connected ENAC ("Cell-m") is monitored and downloaded data within scanned by traditional malware protection software of Vendor-1. Downloaded data can then be transferred to a second (verified clean) ENAC ("Cell-(m+1)") to be scanned by traditional malware protection software of Vendor-2. This process can be repeated multiple times. After ENACs complete the scans, they pass the results to the connected ENAC, which—depending on the outcome—may pass the data to the Protected Internet Data Storage Layer or may quarantine the data (and/or disconnect from the outside Network) if problems are found. These actions can be done in parallel or serially, while ENAC (Cell-m) is connected to the outside network or already off-line.

Figure 3A:
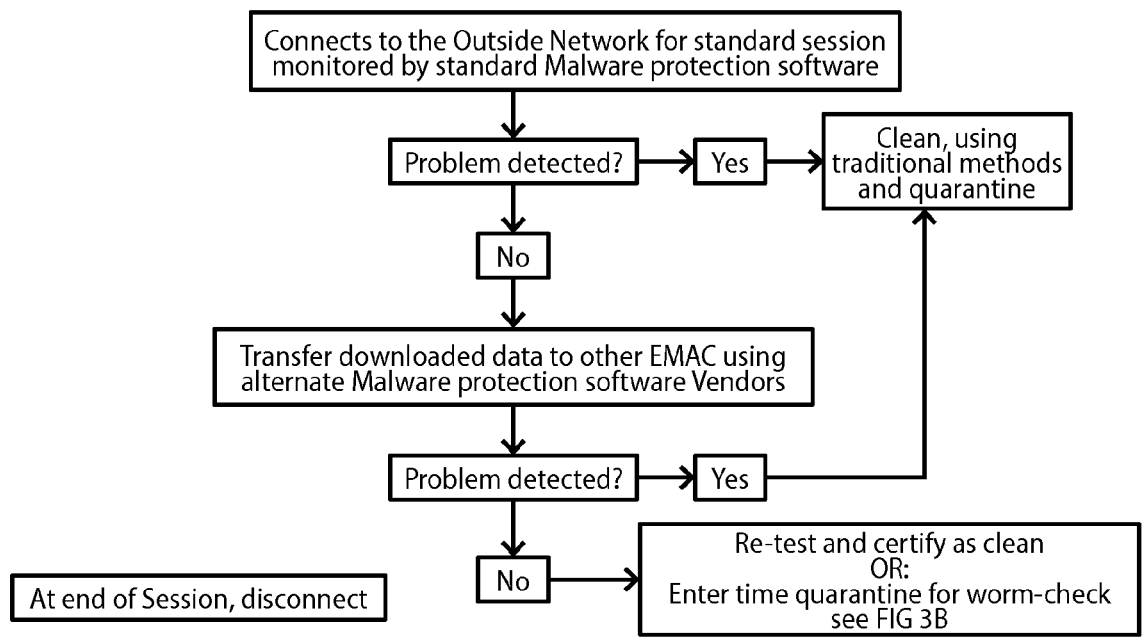
FIG. 3a shows a process flow for an External Network Access Cell (ENAC) that has been requested to provide connectivity.
Figure 3B:
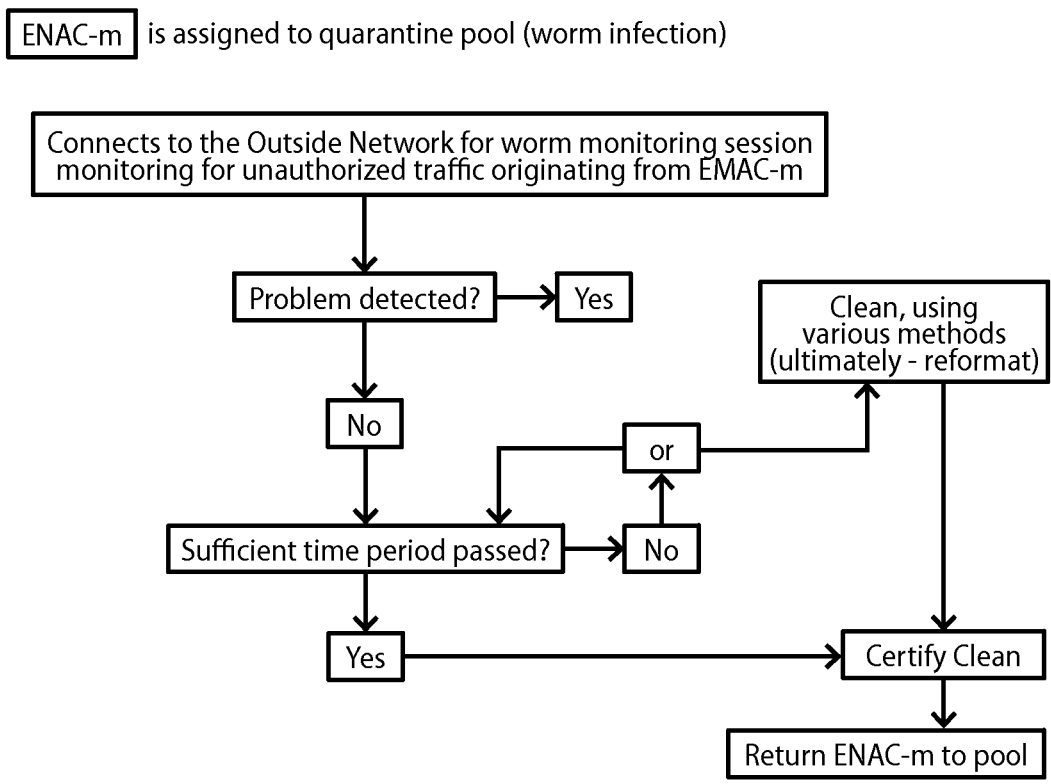
FIG. 3b shows a time quarantine process for worm check.
Figure 4:
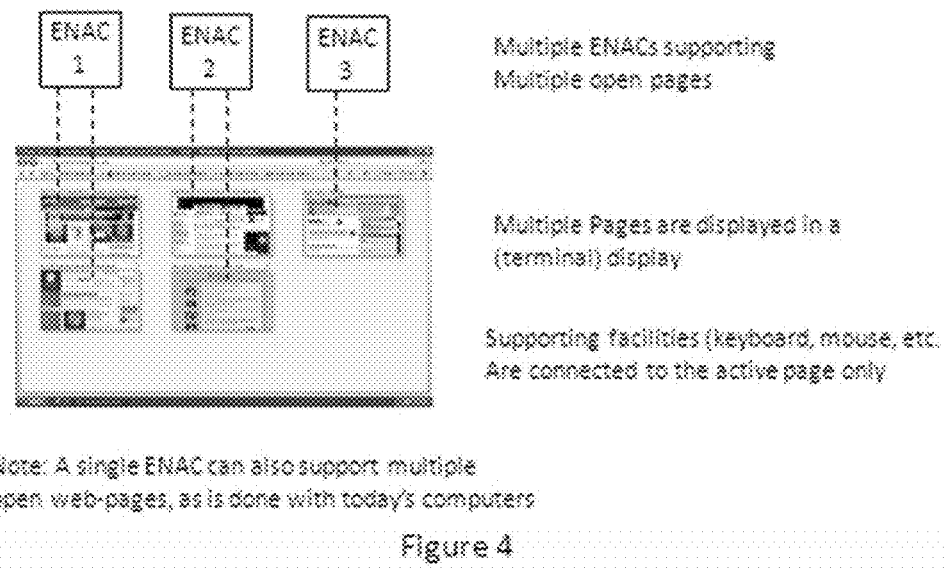
FIG. 4:
Shows how ENACs connect to the shared Graphical User Interface and shared I/O

FIGS. 3a and 3b Connectivity Flow

FIG. 3a shows a process flow for a ENAC that has been requested to provide connectivity.

During the connection to the outside network connection, ENAC-m is monitored by traditional Malware protection software and acts like a PC connected to a network connection. If—during the session—a problem is detected, traditional methods of cleaning the problem apply. In that case, any data that was downloaded will be either disposed or put into quarantine (by user option or automatically).

If the traditional Malware protection software on ENAC-m does not detect a problem, the data which was downloaded may be transferred to other ENACs which are protected by alternate Malware protection software vendors. If a problem that was missed by ENAC-m is detected by any of the alternate Malware protection softwares, ENAC-m is notified.

After the end of the session (after ENAC-m disconnects), ENAC-m may be certified as clean (if none of the Malware protection vendors rose any flag, or may be moved to the time quarantine for worm check. This process is shown in FIG. 3b.

After ENAC-m is assigned to the "worm infection" pool, ENAC-m will connect multiple times to the outside network, trying to induce a worm to become active and transfer data unauthorized to the outside. If this is not detected, ENAC-m may be certified as clean, or, may undergo a thorough clean, in the extreme case being reformatted and reset to a known good state.

After ENAC-m is certified, it is returned to the pool for another assignment.

FIG. 4

The Graphical User Interface (typically on a LCD or CRT screen) and I/O facilities (such as keyboard, mouse and other pointing devices [such as touch-pad], microphone and speakers) are shared by ENACs. Multiple pages being currently accessed by select ENACs are displayed on the terminal. Keyboard and mouse are connected to the currently active page. ENACs may be dedicated to a given page (for example, for Banking and financial transactions) or may support multiple open web-pages, similar to today's computing environment.

The invention claimed is:

1. A system for protection against cyber threats, the system comprising:
an external network accessing layer (ENAL) comprising an array of two or more external network access cells (ENACs) thereby creating a pool of available ENACs, wherein each ENAC comprises an array of ghost addresses, at least one communications port, one or more processors, and one or more working and storage memories, the ENAL is configured to:
receive a data transfer request from a core computing asset connected to the ENAL;
select at least one ENAC from the pool of available ENACs in response to the data transfer request to service the data transfer request;
sever the connection between the core computing asset and the ENAL in response to the selection and received data transfer request;
establish a connection between the selected ENAC and an external network via the at least one communications port of the selected ENAC;
service the data transfer request via the established connection;
sever the established connection between the selected ENAC and the external network;
receive and inspect data received from the external network in the selected ENAC memory and processor; cleanse the received data when infected; reject the data when infected but cannot be adequately cleansed,
certify the data received from the external network as clean when it is inspected as clean, or cleansed when it is cleansed;
re-establish connection from the ENAC to the ENAL, wherein the ENAL further comprises a protected clean data storage area and protected processor operable for preparation of data to be transferred to the core computing asset;
re-establish the connection between the ENAL and the core computing asset;
send the cleaned data to the core computing asset via the re-established connection in response to the inspection indicating the received data as being certified as preliminarily clean;
empty the selected and used ENAC and re-inspect, cleanse, and certify the ENAC as clean;

place the selected, used, and cleansed ENAC back into the pool of available ENACs in response to the selected ENAC being certified as clean;

wherein the ENAL further comprises a protected area containing at least protected storage that is connectable to the at least one ENAC, the core computing asset and data that a user of the computing asset wishes to protect; the protected data storage area is configured to receive the data received from the ENACs after the data passed inspection at the at least one ENAC, or was cleansed in at least one ENAC processor and storage, and when the ENAC's communications with the external network is severed;

wherein the selected at least one ENAC is designated exclusively for a special purpose connection to receive data requested from the external network based on the data transfer request from the core computing asset.

2. The system of claim 1, wherein the ENACs share a plurality of graphical user interfaces and Input/Output peripherals.

3. The system of claim 2, wherein the sharing further comprises multiple users of the computing asset accessing an external network via the at least one ENAC at the same point in time.

4. The system of claim 2, wherein the ENACs are physically separate.

5. The system of claim 2, wherein the ENACs and ENAL are contained within a single integrated circuit chip.

6. The system of claim 5, wherein the single integrated circuit chip possesses a multi-core architecture.

7. The system of claim 1, wherein the protected areas in the ENAL comprises data storage, processor, and software capable of deep inspection and further cleansing of data received from the ENACs.

8. The system of claim 7, wherein the data passed into the protective area of ENAL from an ENAC is further inspected at a deep level, after passing the deep inspection in the ENAL protected data storage area, the data is certified for permanent storage in a download archival area that is not connected or connectable to any external network.

9. The system of claim 1, wherein the core computing asset comprises an email application, and is capable of being connected to an ENAC to upload a composed email while the ENAC is not connected with an external network.

10. The system of claim 1, wherein at least one of the ENACs is dedicated for transaction-specific use.

11. The system of claim 10, wherein the transaction-specific use is a financial transaction.

12. The system of claim 1, wherein communication between the at least one ENAC and a portion of the core computing asset is managed by a switch.

13. The system of claim 1, wherein communication between a portion of the core computing asset and the protected area is managed by a switch; the protected area contains data storage, a processor, and data inspection and cleansing software, providing an additional deep inspection and cleansing beyond the inspection and cleansing provided in ENACs.

14. A method of protecting data and software within a computing asset from cyber threats, comprising:
    receiving, at an external network accessing layer (ENAL), a data transfer request from a core computing asset connected to the ENAL;
    selecting, by the ENAL, at least one external network accessing cell (ENAC) amongst an array of two or more ENACs, in response to the data request;
    severing the connection between the core computing asset and the ENAL in response to the selection and further in response to the received data request;
    establishing a connection between the at least one selected ENAC and an external network via the at least one communications port connected to the at least one selected ENAC;
    servicing the data transfer request via the established connection;
    severing the established connection between the at least one selected ENAC and the external network;
    inspecting data received from the external network in the at least one selected ENAC;
    certifying received data as clean when inspected clean;
    cleanse infected data when can be cleansed, and certify the data as cleansed;
    reject infected data when cannot be adequately cleansed;
    re-establishing the connection between the ENAL and the core computing asset and sending the received clean data, or cleansed data, to the core computing asset via the re-established connection in response to the inspection indicating the received data as being clean, or cleansed;
    wherein the ENAL comprises an additional protected data storage area utilized for safe data storage and transfer to core computing assets, always isolated from external network.

15. The method of claim 14, wherein the inspecting includes analyzing the received data for malware.

16. The method of claim 15, wherein the received data is cleansed of the malware if the malware is detected during inspection.

17. The method of claim 14, wherein the inspecting is performed by the at least one ENAC and the at least one ENAC is disconnected from the external network for the duration of the inspection of the received data.

18. The method of claim 14, wherein at least one of the two or more ENACs are equipped with different malware detection and cleansing applications, and used to process data downloaded from the external network.

19. The method of claim 14, 15 or 16, wherein after passing the inspection of the at least one malware detection application, the received data is transferred to protected ENAL internal upload/download storage area that does not possess connectivity to the internet.

20. The method of 15, wherein the at least one ENAC is made eligible to receive an internet connection after its entirety passes malware inspection.

21. The method of 14, wherein communications with a specific set of high security websites are conducted through a dedicated high security ENAC.

22. The method of claim 14, further comprising:
    comparing performance differences between at least one ENAC and at least one other ENAC; and
    detecting infections potentially not yet detectable with malware detection software in response to said comparing.

23. The method of claim 14, wherein a selection software application selects at least one available ENAC from all of the available ENACs in the ENAL for a user request for connectivity to an external network.

24. The method of claim 14, wherein each ENAC is inspected and cleansed after an external network connection session is terminated, and subsequently returned to the array of ENACs and identified as available.

25. The method of claim 14, wherein each of the two or more ENACs are equipped with different malware detection and cleansing applications, and used to process data downloaded from the external network.

26. The method of claim 14, wherein at least one of the two or more ENACS are equipped with malware detection and cleansing applications, and used to process data downloaded from the external network.

27. The method of claim 14, wherein protected area of the ENAL comprises both data storage and processor equipped with a deeper level of inspection and cleansing software, where data having passed an ENAC can be further inspected in a deeper level and cleansed when a flaw is found.

* * * * *